United States Patent [19]

Katahira

[11] Patent Number: 4,648,726
[45] Date of Patent: Mar. 10, 1987

[54] LINEAR GUIDE DEVICE
[75] Inventor: Masayuki Katahira, Maebashi, Japan
[73] Assignee: Nippon Seiko Kabushiki Kaisha, Tokyo, Japan
[21] Appl. No.: 796,784
[22] Filed: Nov. 12, 1985
[30] Foreign Application Priority Data Dec. 8, 1984 [JP] Japan .................... 59-259460

[51] Int. Cl.⁴ .................... F16C 29/06
[52] U.S. Cl. .................... 384/45
[58] Field of Search .................... 308/6 C, 6 R, 3.8; 464/168; 384/45, 43

[56] References Cited

U.S. PATENT DOCUMENTS 4,128,279 12/1978 Ernst et al. .................... 308/6 C
4,262,974 4/1981 Tojo et al. .................... 308/3.8
4,552,416 11/1985 Lehmann et al. .................... 308/6 C Primary Examiner—Lenard A. Footland
Attorney, Agent, or Firm—Shapiro and Shapiro

[57] ABSTRACT

A linear guide device comprises a long rail, a carriage movable on the rail, a circulation path extending from between the rail and the carriage and through the carriage and again to between the rail and the carriage. The circulation path includes in at least a portion thereof a pipe inserted in the carriage, and a number of balls are disposed in the circulation path. The balls circulate while rolling in the circulation path during movement of the carriage to thereby facilitate the movement of the carriage.

7 Claims, 5 Drawing Figures

LINEAR GUIDE DEVICE

BACKGROUND OF THE INVENTION

1. Field of the Invention

This invention relates to a linear guide device in which a carriage slides on a long rail, and in particular to improvements in a ball circulation path in a miniature linear guide device.

2. Description of the Prior Art

Among linear guide apparatus using a rolling guide, there is known one device which comprises a long rail, a carriage of saddle-like shape (C-shaped cross-section) comprising a body and end caps, and a number of balls for permitting the carriage to slide on the rail. The rail of this linear guide is formed with grooves in the opposite side surfaces thereof parallel to the center axis (lengthwise direction) of the rail, and the body of the carriage is formed with grooves opposed to said grooves. The set of grooves are proximate and opposed to each other, whereby a passageway for the balls is formed. A through-hole having a diameter slightly greater than the diameter of the balls and functioning as a ball return passage is formed in the body of the carriage in juxtaposed relationship with said passageway, and said through-hole and said passageway are connected together by a set of semidoughnut-shaped curved passageways further formed in the end caps, whereby a closed circulation path in which the balls may circulate is formed and the carriage is lightly slidable axially on the rail through the rolling of the balls.

In manufacturing the linear guide device, said through-hole is formed by a drill, but the through-hole is a deep hole and therefore, the formation thereof requires a number of working steps. Particularly, in a miniature linear guide device, the number of working steps is so great that it forms a bottleneck manufacturing. The reason is that the diameter of the through hole is as small as 1-3 mm, whereas the length of the through-hole is as great as 20-50 mm and therefore the working efficiency is low and a long working time is required. Also, the drill is often damaged and further, the through-hole tends to bend. When the through-hole bends, a level difference is created in the ball circulation path to cause unsatisfactory circulation of the balls, which often means the production of defective products.

SUMMARY OF THE INVENTION

It is an object of the present invention to eliminate the above-noted disadvantages peculiar to the prior art.

That is, it is a primary object of the present invention to provide, in a miniature linear guide device, means for accurately and efficiently forming a through-hole as a ball return passageway.

The present invention achieves the above objects by providing in a body a hole having a diameter much greater than the diameter of balls, forcing into the hole a pipe having an inner diameter slightly greater than the originally required diameter of the balls, and utilizing the bore of the pipe as the ball return passageway.

According to the present invention, the diameter of the hole drilled by a drill is made much greater than the diameter of the balls and therefore, the drilling accuracy can be improved and the working efficiency can be greatly increased. Further, an inexpensive drawn pipe or plastics may be chosen as the material of the pipe forced into the through-hole, and the number of working steps required in forcing the pipe into the through-hole is very small.

Heretofore, to make a ball return passageway of a small diameter, a through-hole has been formed by the use of a drill of a small diameter substantially equal to the diameter of the balls and therefore, the number of working steps has been increased and the drill has broken or the through-hole has bent, and this has often led to the production of unsatisfactory products. According to the present invention, however, the ball return passageway is formed by the bore of a pipe forced into a through-hole of a great diameter. Accordingly, a through-hole of a diameter corresponding to the outer diameter of the pipe which is greater than the diameter of the balls may be formed by drilling and, as the diameter of the drill becomes great, drilling becomes remarkably efficient and thus, the above-noted disadvantage can be eliminated by the present invention. Further, by suitably choosing the material of the pipe, it becomes possible to improve the function of the circulation path. For example, if use is made of a pipe formed of plastics impregnated with lubricant, it will lead to the advantages that it is easy to force the pipe into the through-hole, that the circulation friction is low, that the abrasion is low and that the working is easy.

The present invention has the advantage that the working accuracy of the return passageway which has been a bottleneck in the manufacture of a linear guide device can be improved and the working efficiency can be increased and thus the linear guide device can be provided inexpensively.

DESCRIPTION OF THE PREFERRED EMBODIMENT

Figure 1:
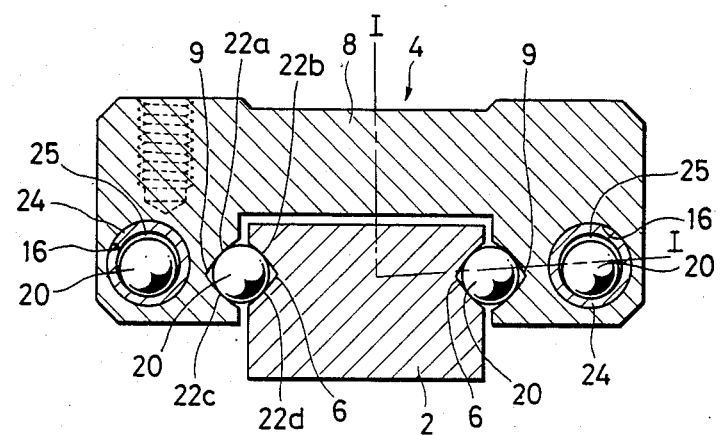
FIG. 1 is a transverse cross-sectional elevation view of a suitable embodiment of the linear guide device according to the present invention.

An embodiment of the present invention will hereinafter be described with reference to the drawings.

A linear guide device comprises a long rail 2 of substantially rectangular cross-section, a carriage 4 of saddle-like, i.e., C-shaped, cross-section mounted on the rail 2, and a number of balls 20 rolling and acting as a rolling guide when the carriage 4 rectilinearly moves along the rail 2. The carriage 4 comprises a body 8, a set of end caps 10a, 10b and a set of seal plates 12a, 12b.

The linear guide device according to the present embodiment is of a shape symmetrical with respect to a vertical plane containing the lengthwise center axis of the rail 2 and therefore, in the following description, overlapping description of one side portion divided by said vertical plane will be omitted.

Grooves 6 in which the balls may roll are formed in the opposite side surfaces of the rail 2 lengthwise thereof parallel to the rail. As shown in FIG. 1, the body 8 is of a saddle-like shape and has inner side surfaces opposed to the opposite side surfaces of the rail 2, and grooves 9 in which the balls may roll are formed in said inner side surfaces. The grooves 9 and the grooves 6 are proximate and opposed to each other, and the area defined by these grooves forms a guide passageway 14 which is a part of the passageway of the balls 20. The cross-sectional shape of the guide passageway 14 is like a Gothic arch-like groove as shown in FIG. 1. In this case, the balls 20 bear against the guide passageway 14 at four support points 22a, 22b, 22c and 22d. For example, when a downward load is applied to the carriage 4, this load is supported by the support points 22a and 22d. Conversely, when an upward load is applied to the carriage 4, this load is supported by the support points 22b and 22c.

Figure 2:
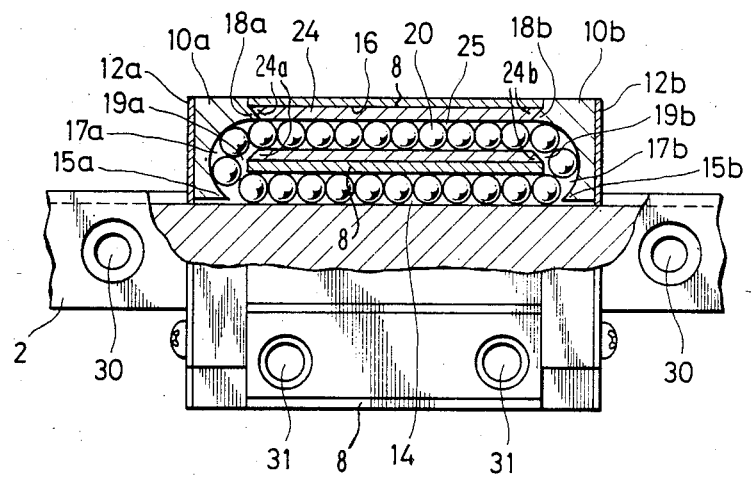
FIG. 2 is a plan view partly cut away along line I—I of FIG. 1.
Figure 3:
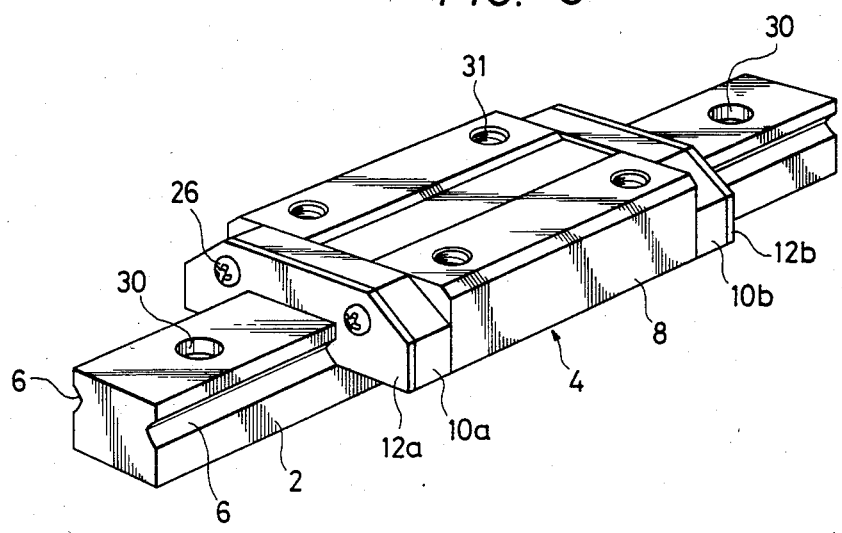
FIG. 3 is a perspective view of the linear guide device of FIG. 1.
Figure 4:
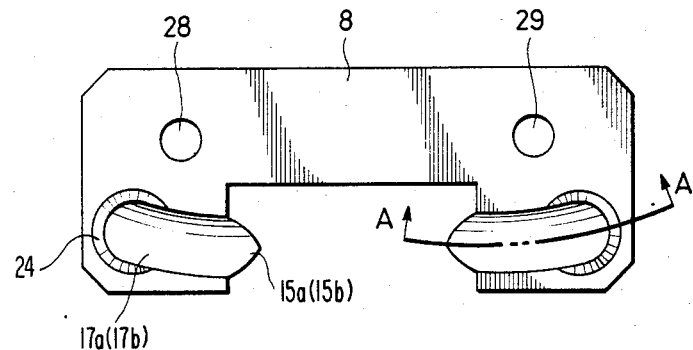
FIG. 4 shows an end surface of the carriage body, and schematically shows the curved passageways only of an end cap for the body.
Figure 5:
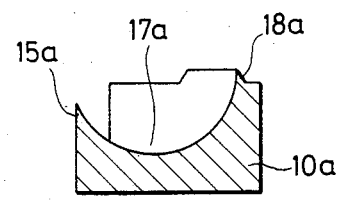
FIG. 5 is an enlarged sectional view along line A—A of FIG. 4 showing the details of a recess formed in an end cap.

FIG. 2 shows plan view of the exemplary embodiment, partly cut away along line I—I of FIG. 1. As shown in FIG. 2, a through-hole 16 having a diameter much greater than the diameter of the balls 20 is provided in the body 8 rearwardly of the groove 9 in juxtaposed relationship with the guide passageway 14, and a pipe 24 is forced into the through-hole 16. The pipe bore of the pipe 24 provides a return passageway 25 for the balls, and the diamater thereof is slightly greater than the diameter of the balls 20. The material of the pipe 24 may be a metal or plastics.

For example, linear guide devices in apparatus for manufacturing semiconductors or the like are used in a clean atmosphere and are required not to contaminate the atmosphere. When the linear guide device of the present invention is utilized in such apparatus, if the pipe 24 is formed of a plastic material, the balls 20 can be prevented from producing abrasion powder when they move in the ball return passageway 25 and thus, the clean atmosphere will not be contaminated. Further, if the pipe 24 is formed of an oil-containing plastic material impregnated with lubricating oil, it will be unnecessary to use grease which is used in the case of a metal. Therefore, there will be no danger of the atmosphere being contaminated by the vaporization of grease. Suitable oil-containing plastic materials include oil-containing polyacetals, oil-containing polyamides, oil-containing polyesters, etc.

The set of end caps 10a and 10b are formed with substantially semicircular arcuate recesses 17a and 17b, respectively. The recesses 17a and 17b are made so as to be connected to one end of the return passageway 25 and one end of the guide passageway 14, respectively. In the junctures between the recesses 17a, 17b and the return passage 25, chamfers 24a, 24b are formed on the end portions of the return passageway 25 (i.e., the ends of pipes 24) and protrusions 18a and 18b fitted to the chamfers 24a, 24b are formed on the sides of the end caps. The end caps 10a and 10b are positioned by the engagement between these protrusions 18a, 18b and said chamfers 24a, 24b. The other ends of the recesses 17a and 17b provide ball scooping portions 15a and 15b entering into the grooves 6 of the rail. Holes 28 and 29 are threaded holes for mounting the end caps.

As will be seen from the foregoing description, the guide passageway 14, return passageway 25 and curved passageways 19a, 19b formed between the ends of body 8 and the recesses 17a, 17b jointly together constitute a closed circulation path in which the balls circulate (see FIG. 2).

To assemble the linear guide device, the end cap 10b together with the seal plate 12b is first fixed to one end of the body 8 by means of screws 26. The body is fitted to the rail 2 to thereby make the groove 6 and the groove 9 opposed to each other and form the guide passageway 14. The balls 20 are inserted into the pipe bore through the other end of the body, and then the balls 20 are inserted into the recess 17a of the still unassembled end cap 10a. Grease prevents the balls from falling out of the end cap. The end cap 10a together with the seal plate 12a is fixed to the body by means of screws 26.

When the carriage 4 moves to the left as viewed in FIG. 2, the balls in the guide passageway 14 formed by the rail 2 and the body 8 of the carriage roll in the carriage and support it. With the sliding movement of the carriage 4, these balls 20 roll in the guide passageway 14 and move rightwardly relative to the body 8 and are scooped up by the scooping portion 15b at the end portion of the body 8. The balls pass through the curved passageway 19b and the return passageway 25 into the opposite curved passageway 19a and further into the guide passageway 14 between the body and the rail. They rollingly support the carriage relative to the rail 2 and therefore, the carriage 4 lightly slides axially.

The operation when the carriage moves to the right is similar to what has been described, and therefore need not be described.

In the linear guide device according to the present embodiment, chamfers are provided on the end portions of the return passageway and the protrusions formed at the edges of the recesses of the end caps are engaged with these chamfers, whereby the end caps are positioned relative to the body so located, if the end caps are simply fastened to the body by means of the screws 26, the end caps can be assembled at proper positions.

In the drawings, reference numeral 30 designates bolt holes for mounting the rail, and reference numeral 31 denotes threaded holes for mounting the carriage.

I claim:

1. A linear guide device comprising: a long rail having grooves formed axially thereof;
   a carriage including a saddle-shaped body having grooves proximate and opposed to said grooves of said rail, and a pair of end caps mounted respectively on the opposite ends of said body; and
   a number of balls rolling in a plurality of circulation paths formed by said rail and said carriage;
   each said circulation path including:
      a guide passageway formed by one of the grooves of said rail and one of the grooves of said body;
      a ball return passageway provided in said body in juxtaposed relationship with said guide passageway; and
      a set of curved passageways formed in said end caps to connect said guide passageway to said return passageway:
      said return passage having a pipe forced into a through-hole extending through said body;
   each said pipe having a chamfered end portion which engages a corresponding projection of the end cap at one end of said body, whereby that end cap may be precisely positioned on said body.

2. A linear guide device according to claim 1, wherein each said pipe is formed of a plastic material.

3. A linear guide device according to claim 1, wherein each said pipe is formed of an oil-containing plastic material impregnated with lubricating oil 4. A linear guide device according to claim 1, wherein the grooves formed in said rail and said body are Gothic arch-shaped.

5. A linear guide device according to claim 1, wherein said end caps, each together with a seal plate disposed outside thereof, are secured to said body by means of screws.

6. A linear guide device according to claim 1, wherein each said pipe has an additional chamfered end portion which engages a corresponding projection of the end cap at the end of said body opposite said one end thereof.

7. A linear guide device according to claim 1, wherein each said pipe is encased within said body.

* * * * *